(12) United States Patent
Hirai et al.

(10) Patent No.: US 9,832,346 B2
(45) Date of Patent: Nov. 28, 2017

(54) IMAGE FORMING APPARATUS, AND SYSTEM AND METHOD FOR SUPPORTING PREPARATION OF APPLICATION FORM

(71) Applicants: Kohichi Hirai, Kanagawa (JP); Atsuhisa Saitoh, Kanagawa (JP)

(72) Inventors: Kohichi Hirai, Kanagawa (JP); Atsuhisa Saitoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/093,158

(22) Filed: Apr. 7, 2016

(65) Prior Publication Data

US 2016/0381250 A1    Dec. 29, 2016

(30) Foreign Application Priority Data

Apr. 22, 2015   (JP) ................................ 2015-087587

(51) Int. Cl.
| | | |
|---|---|---|
| *H04N 1/44* | (2006.01) | |
| *H04N 1/32* | (2006.01) | |
| *G06F 3/12* | (2006.01) | |
| *H04N 1/00* | (2006.01) | |
| *H04N 1/42* | (2006.01) | |

(52) U.S. Cl.
CPC ......... *H04N 1/4426* (2013.01); *G06F 3/1204* (2013.01); *G06F 3/1243* (2013.01); *G06F 3/1285* (2013.01); *H04N 1/00114* (2013.01); *H04N 1/00251* (2013.01); *H04N 1/00344* (2013.01); *H04N 1/00411* (2013.01); *H04N 1/32149* (2013.01); *H04N 1/42* (2013.01); *H04N 2201/0094* (2013.01)

(58) Field of Classification Search
CPC ............. H04N 1/4426; H04N 1/00114; H04N 1/00251; H04N 1/00344; H04N 1/00411; H04N 1/32149; H04N 1/42; H04N 2201/0094; G06F 3/1204; G06F 3/1243; G06F 3/1285

See application file for complete search history.

(56) References Cited

U.S. PATENT DOCUMENTS

| 8,733,641 | B1 * | 5/2014 | Drew | ..................... G06Q 50/22 |
|---|---|---|---|---|
| | | | | 235/381 |
| 2011/0145017 | A1 * | 6/2011 | Lee | ........................ G06Q 10/10 |
| | | | | 705/3 |
| 2013/0100477 | A1 * | 4/2013 | Ozaki | ................... G06F 3/1204 |
| | | | | 358/1.13 |

FOREIGN PATENT DOCUMENTS

JP        2000-177283        6/2000

* cited by examiner

*Primary Examiner* — Iriana Cruz
(74) *Attorney, Agent, or Firm* — Cooper & Dunham LLP

(57) ABSTRACT

An image forming apparatus includes a user interface, circuitry, and an image forming device. The user interface receives, from an applicant, an instruction for selecting a desired application form having an entry field in which personal information is to be entered, and receives an input of individual authentication information of the applicant. The circuitry unlocks an IC card based upon the individual authentication information of the applicant to acquire personal information of the applicant from the IC card, and generates an application form for output from a template of the selected application form and the personal information acquired from the IC card. The image forming device outputs the generated application form.

13 Claims, 18 Drawing Sheets

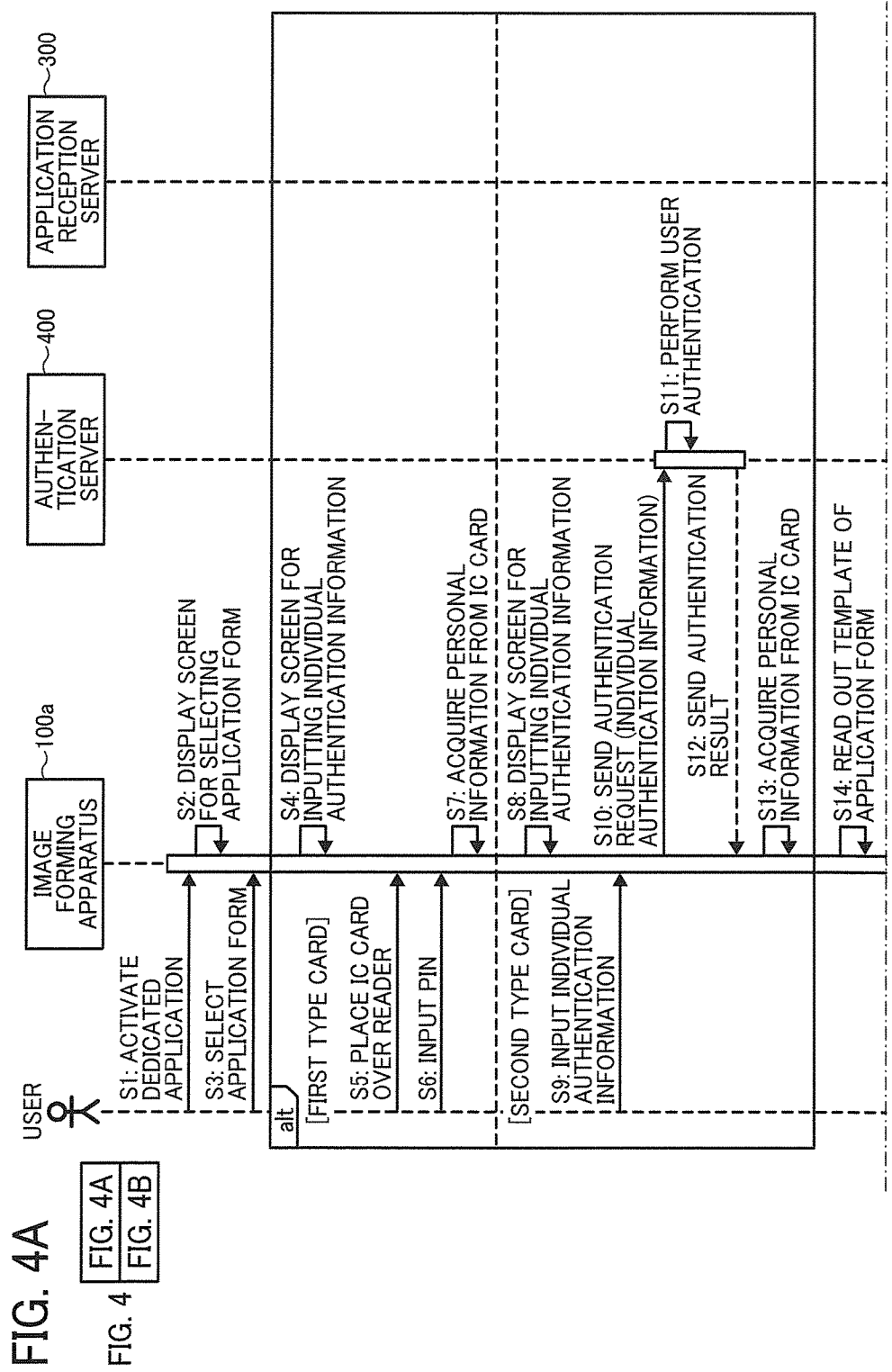

FIG. 5A

```
PREPARE APPLICATION FORM

PLEASE SELECT APPLICATION FORM

XXX APPLICATION FORM
        YYY APPLICATION FORM
        ZZZ APPLICATION FORM
```

FIG. 5B

```
PREPARE APPLICATION FORM

PLEASE SELECT MENU

PREPARE APPLICATION
               FORM

UPDATE PERSONAL
          INFORMATION
```

FIG. 5C

```
PREPARE APPLICATION FORM

DO YOU WANT TO USE YOUR IC CARD
  TO INPUT PERSONAL INFORMATION?

YES

| USER ID | NAME | SEX | ADDRESS | BIRTH | FACE PHOTO |
|---|---|---|---|---|---|
| 1234-5678-9012 | TARO RICOH | MALE | XXX, YYY OHTA-KU, TOKYO | 01/03/1984 | Image123.jpg |
| 2345-6789-0123 | HANAKO KANNON | FEMALE | ZZZ, XXX SUGINAMI-KU, TOKYO | 25/12/1971 | NO REGISTERED DATA |
| ... | ... | ... | ... | ... | ... |

500

IMAGE FORMING APPARATUS, AND SYSTEM AND METHOD FOR SUPPORTING PREPARATION OF APPLICATION FORM

CROSS-REFERENCE TO RELATED APPLICATIONS

This patent application is based on and claims priority pursuant to 35 U.S.C. §119(a) to Japanese Patent Application No. 2015-087587, filed on Apr. 22, 2015, in the Japan Patent Office, the entire disclosure of which is hereby incorporated by reference herein.

BACKGROUND

Technical Field

The present disclosure relates to an image forming apparatus, and a system and method for supporting preparation of an application form.

Description of the Related Art

Applying for identification (ID) cards such as user cards or membership cards usually requires applicants to fill in their personal information, such as an address, name, or date of birth, on an application form. Such work of filling out the application form is bothersome for many people, and can be burdensome especially for the elderly.

SUMMARY

An image forming apparatus includes a user interface, circuitry, and an image forming device. The user interface receives, from an applicant, an instruction for selecting a desired application form having an entry field in which personal information is to be entered, and receives an input of individual authentication information of the applicant. The circuitry unlocks an IC card based upon the individual authentication information of the applicant to acquire personal information of the applicant from the IC card, and generates an application form for output from a template of the selected application form and the personal information acquired from the IC card. The image forming device outputs the generated application form.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 4A and 4B are sequence diagrams illustrating an operation executed by the network system of FIG. 1;

FIGS. 5A to 5C are views, each illustrating a service screen provided by an application form preparation application according to an exemplary embodiment of the present invention;

FIG. 13 is a view illustrating a personal information management table according to an exemplary embodiment of the present invention;

Figure 1:
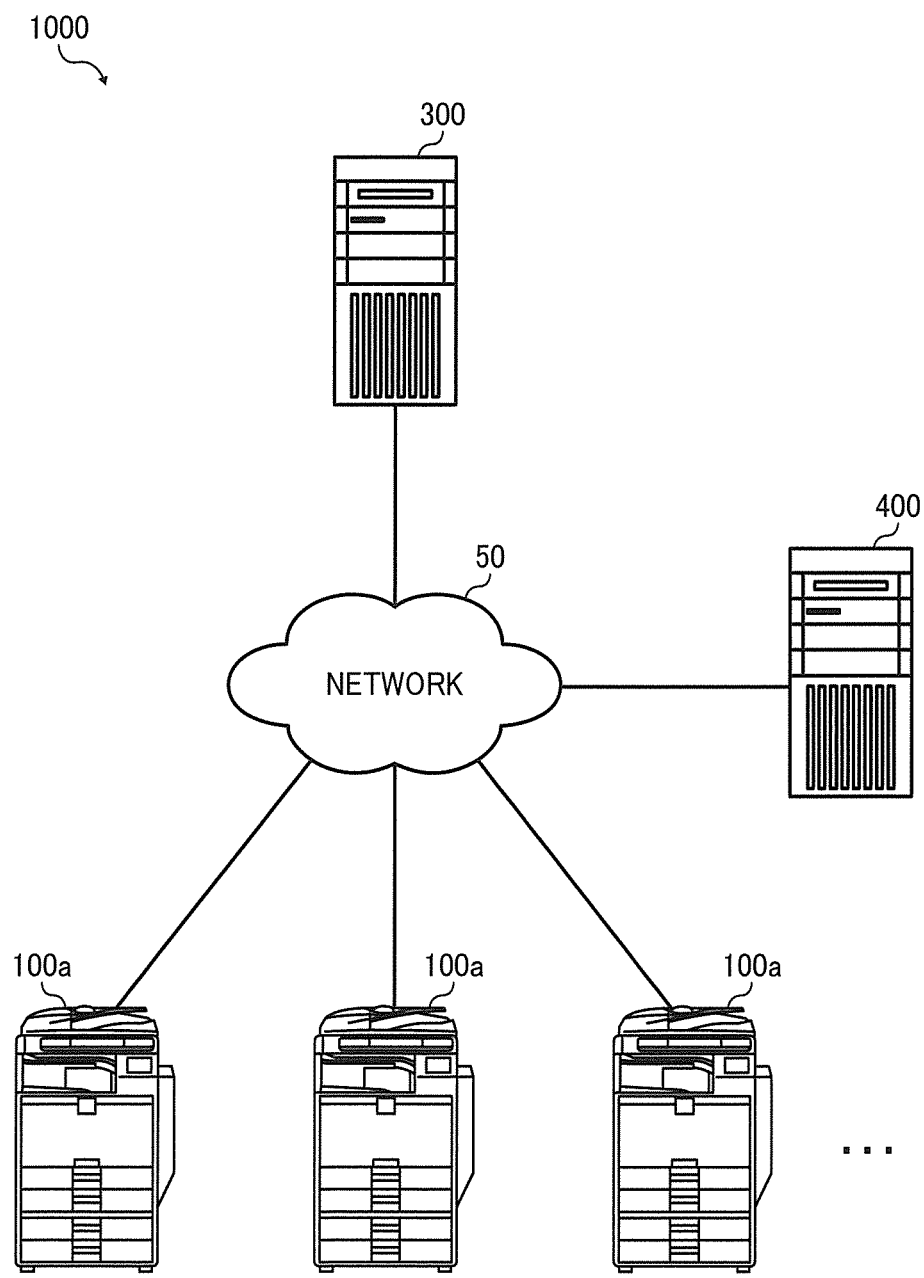
FIG. 1 is a schematic view illustrating a network system including an image forming apparatus according to an exemplary embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the drawings for describing the following embodiments, the same reference numbers are allocated to elements (members or components) having the same function or shape and redundant descriptions thereof are omitted below.

FIG. 1 is a view illustrating a network system 1000 including an image forming apparatus 100a according to an exemplary embodiment of the present invention. The network system 1000 includes at least one image forming apparatus 100a, an application reception server 300, and an authentication server 400. The image forming apparatus 100a, the application reception server 300, and the authentication server 400 are communicably coupled to one another via a network 50, which may be implemented by, for example, a wide area network (WAN) such as the Internet or a virtual private network (VPN).

The image forming apparatus 100a according to this embodiment is a network-capable image forming apparatus including a printing engine supporting an electrophotographic system or an inkjet printing system. The image forming apparatus 100a may be implemented, for example, by a multifunction peripheral (MFP). The image forming apparatus 100a is provided with, in addition to standard functions such as copying, faxing, or scanning, a dedicated application program for supporting preparation of various application forms. Such dedicated application software is referred to as a "dedicated application" hereinafter. The application reception server 300 is a network-capable information processing apparatus, for receiving the application form from the image forming apparatus 100a.

Figure 2:
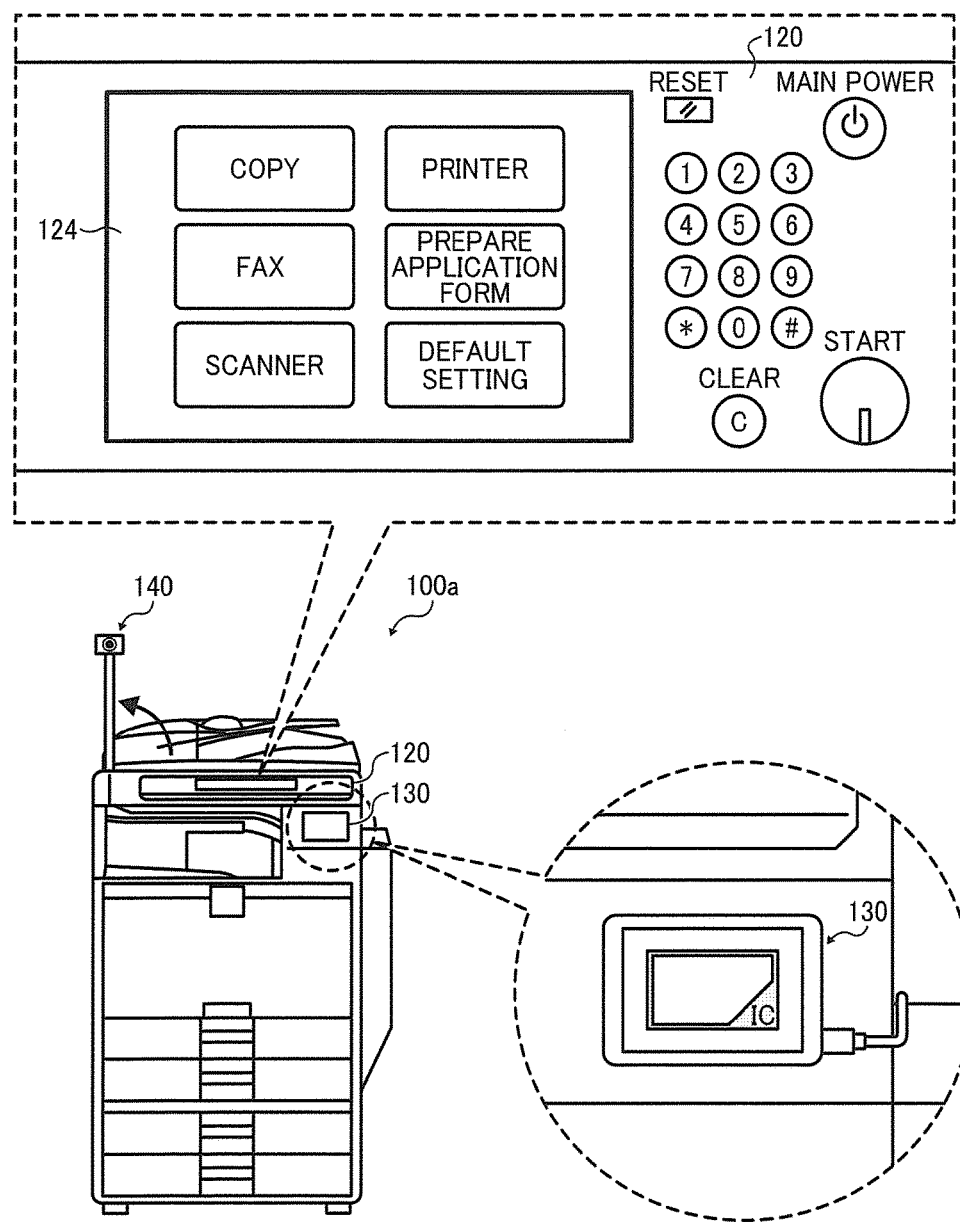
FIG. 2 is an external view of the image forming apparatus of FIG. 1.

FIG. 2 illustrates an external view of the image forming apparatus 100a. As illustrated in FIG. 2, the image forming apparatus 100a includes a control panel 120, an integrated circuit (IC) card reader 130, and a digital camera 140, which is an example of an imaging device. The control panel 120 includes a display 124 that supports a touch panel system. The image forming apparatus 100a receives an instruction or a selection made by a user via a graphical user interface (GUI) displayed on the display 124.

Further, the image forming apparatus 100a acquires information from an IC card via the IC card reader 130. The IC card reader 130 supports at least one of contact or contactless systems.

Furthermore, the image forming apparatus 100a acquires an image of a user captured by the digital camera 140. The digital camera 140 is capable of capturing a still picture as well as video with audio. The digital camera 140 is installed on the image forming apparatus such that the digital camera 140 can capture a user's face.

A description has been given above of the configuration of the network system 1000 and the external view of the image forming apparatus 100a. Hereinafter, a description is given of the functional configurations of the image forming apparatus 100a, the application reception server 300, and the authentication server 400 of the network system 1000 with reference to a block diagram of FIG. 3.

The image forming apparatus 100a according to this exemplary embodiment includes an application form selection acceptance unit 102, an individual authentication information input acceptance unit 103, a personal information acquisition unit 104, a user support unit 105, an application form generator 106, an application form output unit 107, and a template management unit 108.

The application form selection acceptance unit 102 receives an input for selecting a desired application form.

The individual authentication information input acceptance unit 103 receives an input of individual authentication information relating to the IC card or individual authentication information to be transmitted to the authentication server 400.

The personal information acquisition unit 104 acquires personal information from the IC card that the user possesses.

The application form generator 106 generates an application form based on the personal information acquired from the IC card.

The application form output unit 107 outputs the generated application form.

The user support unit 105 supports an applicant. For example, as described below referring to FIG. 9A, the user support unit 105, when instructed by the user, starts communication with a server at a remote support center to allow the user to communicate with a remote operator who can assist in preparing the application form.

The template management unit 108 stores a template of the application form.

Figure 16A:
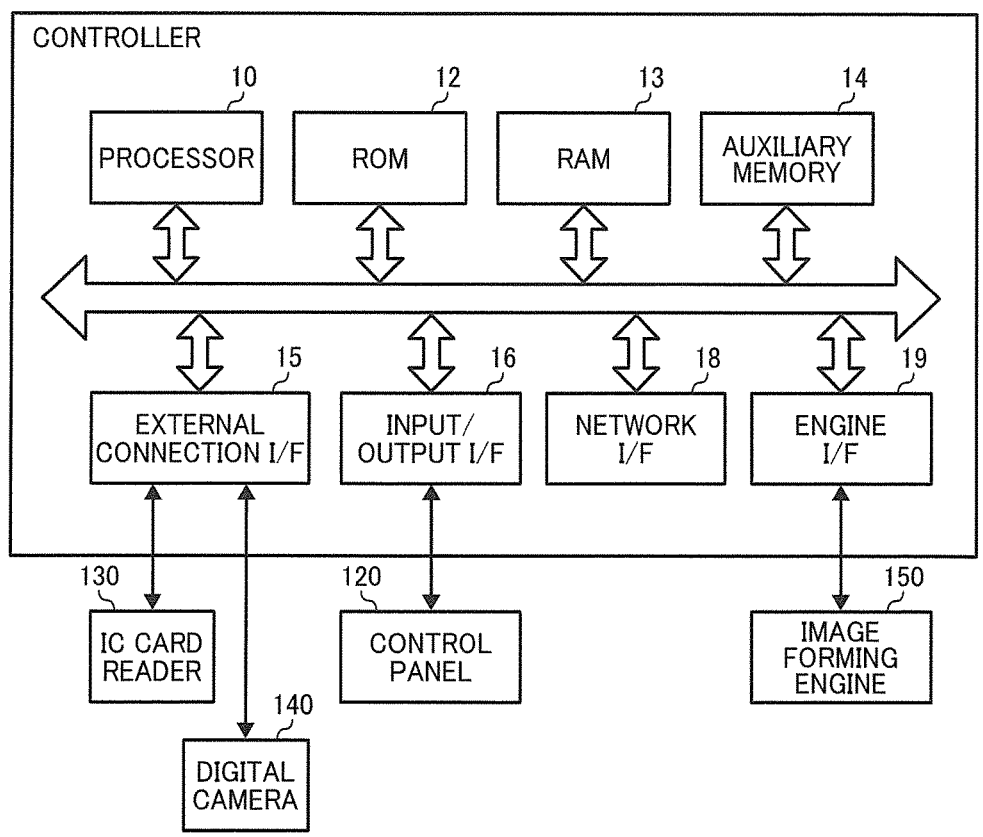
FIG. 16A is a block diagram illustrating a hardware configuration of image forming apparatus of FIG. 1.

These units 102 to 108 are implemented by the dedicated application installed on the image forming apparatus 100a, which operate in cooperation with hardware as illustrated in FIG. 16A.

The application reception server 300 according to this exemplary embodiment includes an application form receiver 302 and a receipt issuance unit 304.

The application form receiver 302 receives image data of the application form from the image forming apparatus 100a.

The receipt issuance unit 304 issues a receipt indicating that the image data of the application form is received.

The authentication server 400 according to this exemplary embodiment includes a user authentication unit 402 and an individual authentication information management unit 404.

The user authentication unit 402 performs user authentication.

The individual authentication information management unit 404 manages the individual authentication information of the user. In this exemplary embodiment, the individual authentication information includes a user identification (ID) and a password.

A description has been given above of the overview of functional configurations of the image forming apparatus 100a, the application reception server 300, and the authentication server 400 of the network system 1000. Hereinafter, a description is given of operations performed by each unit of the image forming apparatus 100a, the application reception server 300, and the authentication server 400 with reference to a sequence diagram of FIGS. 4A and 4B. In the following description, FIG. 3 will also be referenced as necessary.

First, a user (e.g., an applicant) who is going to prepare the application form touches a virtual button of "PREPARE APPLICATION FORM" in a main menu (see FIG. 2) displayed on the display 124 of the control panel 120 of the image forming apparatus 100a to cause the image forming apparatus 100a to activate the dedicated application. That is, the image forming apparatus 100a receives the user selection of dedicated application, and activates the dedicated application (S1). According to the dedicated application, the application form selection acceptance unit 102 displays, on the display 124, a screen that allows the user to select a desired application form (referred to as an "application form selection screen" hereinafter) (S2).

FIG. 5A illustrates an example of the application form selection screen displayed at S2. As illustrated in FIG. 5A, the application form selection screen displayed at S2 includes virtual buttons that allow the user to select one of application forms that the dedicated application supports. Examples of the application forms displayed on the application form selection screen may include a user card application form of a library, a membership card application form of a rental shop, and a loyalty card application form. The application form according to this exemplary embodiment is not limited to the ID card application form. The application form according to this exemplary embodiment may include any document submitted as long as the document lists personal information to be filled in, whatever document names or uses.

The user touches one of the virtual buttons displayed on the application form selection screen to select an application form that the user wants to prepare. The image forming apparatus 100a receives the user selection of application form (S3). In response to the input from the user, the individual authentication information input acceptance unit 103 displays, on the display 124, a screen that allows a user to input the individual authentication information (hereinafter referred to as an "individual authentication information input screen").

In this exemplary embodiment, an IC chip contained in the IC card stores a set of the user's personal information such as a name, address, date of birth and sex such that the personal information is unlocked to be read out via an individual authentication process. In this exemplary embodiment, the IC card is categorized into two types, which are a first type IC card and a second type IC card. The first type IC card authenticates an individual according to an input of a personal identification number (PIN) code to the IC chip, whereas the second type IC card authenticates an individual using an authentication result from an external authentication server. Hereinafter, a description is given of two different operations; one executed where the first type IC card is used, and the other executed where the second type IC card is used.

First, a description is given of an operation in which the first type IC card is used. Examples of the first type IC card may include the Basic Resident Registration card, an IC driver's license, and the Individual Number card. The Individual Number card is a card bearing the Individual Number, which is a 12-digit ID number that is issued to all citizens and residents of Japan. It is like the Social Security card of the United States, and contains an IC chip storing the bearer's personal information such as name, address, date of birth, and sex.

Figure 6A:
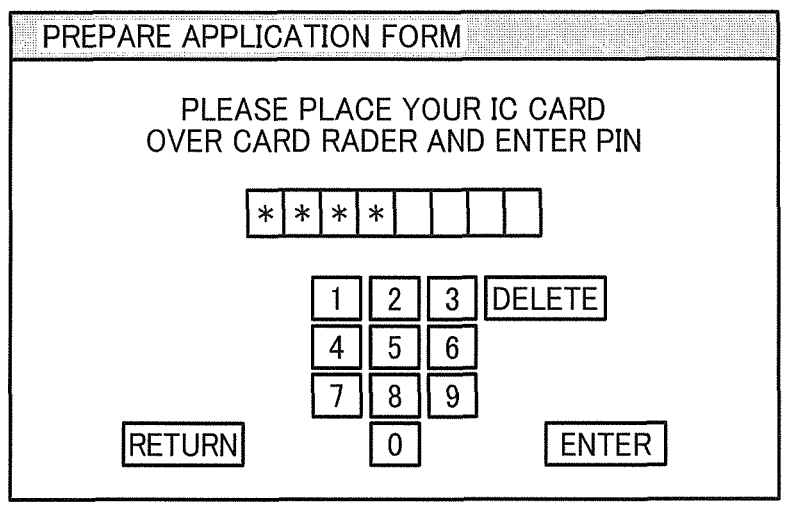
FIGS. 6A and 6B are views, each illustrating a service screen provided by an application form preparation application according to an exemplary embodiment of the present invention.

In an operation in which the first type IC card is used, the individual authentication information input acceptance unit 103 displays, on the display 124, the individual authentication information input screen (S4). FIG. 6A illustrates an example of the individual authentication information input screen displayed at S4. As illustrated in FIG. 6A, the individual authentication information input screen displayed at S4 includes a message such as "PLEASE PLACE YOUR IC CARD OVER IC CARD READER" and the GUI such as a virtual numeric keypad that allows the user to input the PIN code as the individual authentication information.

Following the message displayed on the individual authentication information input screen, the user places his/her IC card over the IC card reader 130 (S5) and inputs the PIN (S6). In response to the "ENTER" button being touched after S6, the personal information acquisition unit 104 sends the PIN that is input at S6 to the IC card via the IC card reader 130. The IC chip contained in the IC card performs authentication processing based on the received PIN, and unlocks the personal information stored therein provided that the authentication has succeeded. In response to the personal information being unlocked, the personal information acquisition unit 104 reads out the personal information stored in the IC chip via the IC card reader 130 (S7).

Figure 6B:
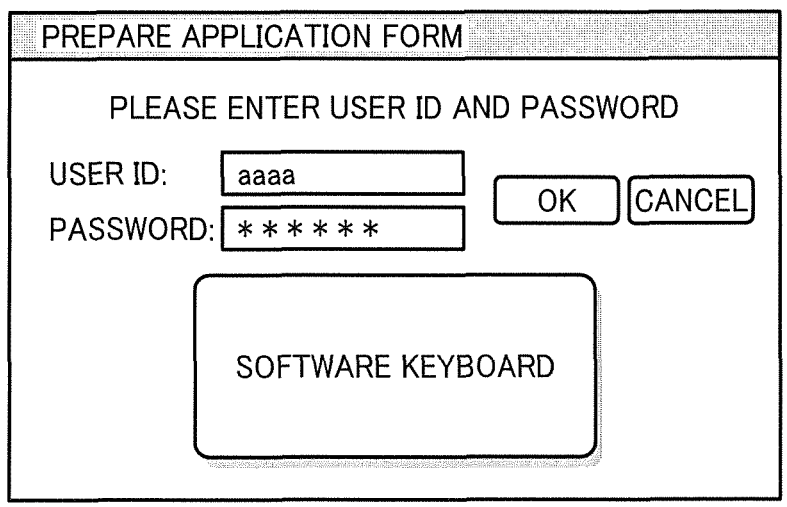

By contrast, in an operation in which the second type IC card is used, the individual authentication information input acceptance unit 103 displays, on the display 124, the individual authentication information input screen (S8). FIG. 6B illustrates an example of the individual authentication information input screen displayed at S8. As illustrated in FIG. 6B, the individual authentication information input screen displayed at S8 includes an input form to enter the user ID and the password as the individual authentication information and a software keyboard. Alternatively, in this exemplary embodiment, input of biometric data of the user may be required instead of or in addition to the password.

The user inputs individual authentication information (e.g., the user ID and the password) via the individual authentication information input screen (S9). In response to this input from the user, the personal information acquisition unit 104 sends an authentication request including the individual authentication information that is input at S9 to the authentication server 400 (S10). In response to receiving the authentication request, the user authentication unit 402 of the authentication server 400 verifies the individual authentication information included in the authentication request against the individual authentication information managed by the individual authentication information management unit 404 to authenticate the user (S11). Then the authentication unit 402 sends the authentication result to the image forming apparatus 100a (S12).

The personal information acquisition unit 104 sends the authentication result received from the authentication server 400 to the IC card via the IC card reader 130. The IC chip contained in the IC card unlocks the personal information stored therein based on the received authentication result indicating that the authentication has succeeded. In response to the personal information being unlocked, the personal information acquisition unit 104 reads out the personal information stored in the IC chip via the IC card reader 130 (S13).

In response to the personal information being acquired from the user's IC card (the first or second type IC card) by the personal information acquisition unit 104, the application form generator 106 reads out, from the template management unit 108, a template corresponding to the application form that the user has selected at S2 (S14).

The template herein means data having at least one entry field for the personal information (e.g., a blank area to which a piece of the personal information is filled). A document is completed by entering data in the entry field. The template may have an area to which a face photograph as the personal information is attached. In addition, the template may include an additional entry field for an item other than the persona information.

The application form generator 106 enters each piece of the personal information of the user that is acquired at S7 or S13 in the entry field for the personal information provided in the template that is read out at S14. When the template that is read out at S14 has the entry fields for the "name", "address", "date of birth", and "sex", for example, the application form generator 106 extracts the corresponding pieces of personal information from the user's personal information acquired from the IC card to enter each piece of the personal information in the corresponding entry field.

In addition, when the template that is read out at S14 has the area to which the face photograph is to be attached, the application form generator 106 determines whether the user's personal information acquired at S7 or S13 includes the face photograph. Based on the determination indicating that the face photograph is included in the user's personal information acquired at S7 or S13, the application form generator 106 embeds the acquired face photograph in the corresponding attachment area to synthesize the face photograph with the template. When the face photograph is not included in the personal information acquired at S7 of S13, the application form generator 106 displays, on the display 124, a screen that gives the user a guidance of taking the user's face photograph (referred to as a "face photograph guidance screen" hereinafter) (S15).

Figure 7A:
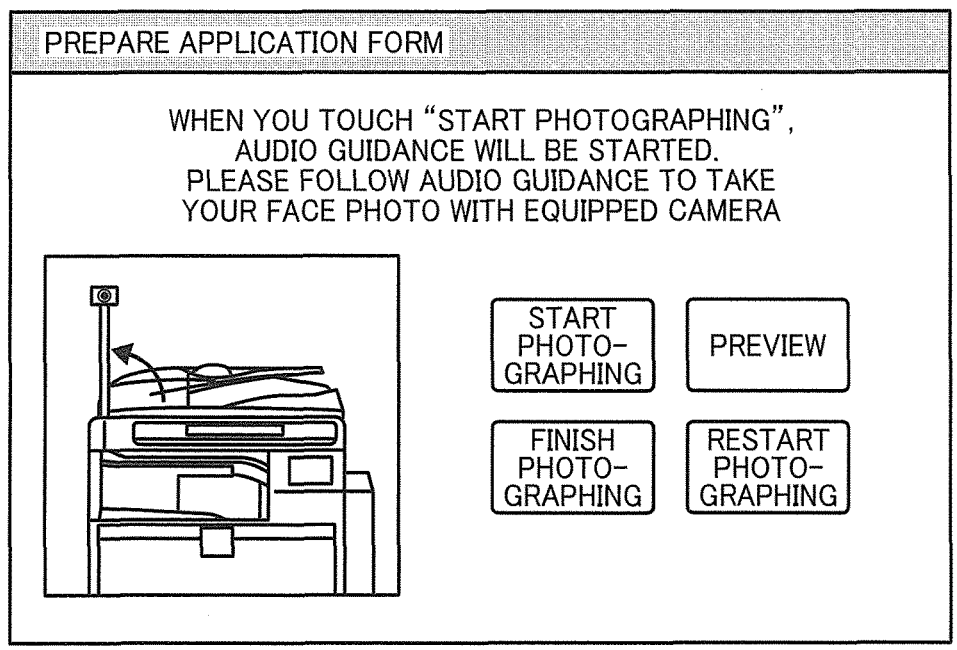
FIGS. 7A and 7B are views, each illustrating a service screen provided by an application form preparation application according to an exemplary embodiment of the present invention.

FIG. 7A illustrates an example of the face photograph guidance screen displayed at S15. The user touches a virtual operation button displayed on the face photograph guidance screen to take the user's face photograph with the digital camera 140 (S16). Thus, the user's face photograph is acquired (S17). The application form generator 106 embeds the face photograph acquired at S17 in the corresponding attachment area to synthesize the face photograph with the template (S18).

Figure 7B:
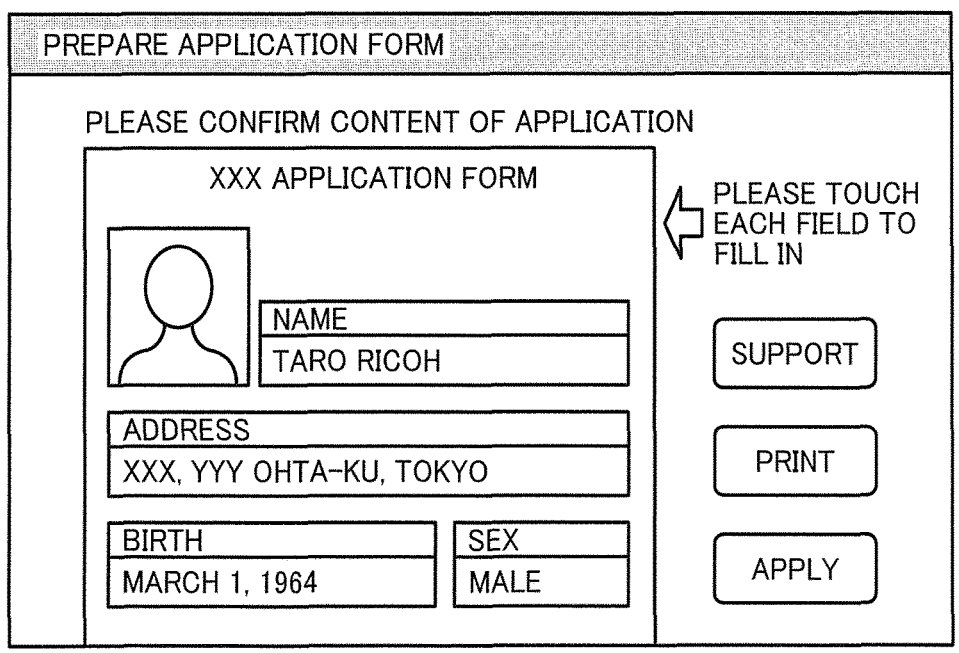

Subsequently, the application form generator 106 displays, on the display 124, a screen that allows the user to confirm a content of the application form (referred to as a "content confirmation screen" hereinafter) (S19). FIG. 7B illustrates an example of the content confirmation screen displayed at S13. As illustrated in FIG. 7B, the content confirmation screen displayed at S13 includes a preview screen of the application form and three virtual buttons, "SUPPORT", "PRINT", and "APPLY". As illustrated in FIG. 7B, the application form has been so far filled out with the necessary personal information.

When the user touches the entry field of the application form on the preview screen, the touched entry field becomes active such that the entry field accepts the user's manual input and the content that is input manually by the user is entered in a corresponding area of the template. With such configuration, the user may modify the content of the personal information that has been entered automatically, input data in an entry field for a necessary item other than the personal information, and/or replace the face photograph that has been automatically embedded and synthesized with the template.

After confirming the content of the application form on the preview screen and modifying the content as necessary, the user instructs the image forming apparatus 100a to output the application form (S20). Specifically, the user touches either the "PRINT" or "APPLY" button displayed on the content confirmation screen.

When the user touches the "PRINT" button, the application form output unit 107 converts the template which is filled out with the necessary information to image data having a predetermined format such as JPEG, BMP, GIF, TIFF, or PDF (S21). Such image data that is converted from the template will be referred to as an "application form image" hereinafter. The application form output unit 107 causes a printer unit to print the application form image.

By contrast, when the user touches the "APPLY" button, the application form output unit 107 sends data of the template, which is filled out with the necessary information, to the application reception server 300 (S23). Such data of the template that is filled out with the necessary information will be referred to as "application form data" hereinafter. The application form receiver 302 of the application reception server 300 receives the application form data from the application form output unit 107 (S24). Then, the application form receiver 302 generates a predetermined receipt based on the received application form data to send the receipt to the image forming apparatus 100a (S25). The application form output unit 107 of the image forming apparatus 100a causes the printer unit to print the receipt sent from the application reception server 300 (S26). The user acquires the printed receipt (S27).

Figure 8A:
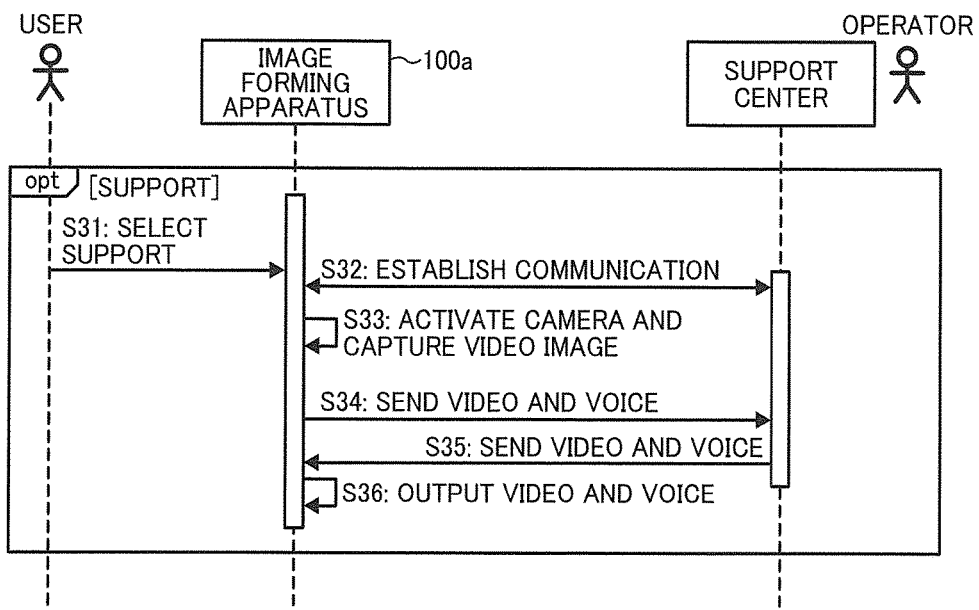
FIG. 8A is a sequence diagram illustrating an operation executed by the network system of FIG. 1.

Hereinafter, a description is given of an operation executed where the user touches the "SUPPORT" button displayed on the content confirmation screen with reference to a sequence diagram of FIG. 8A.

Figure 9A:
FIGS. 9A and 9B are views, each illustrating a service screen provided by an application form preparation application according to an exemplary embodiment of the present invention.
Figure 9B:
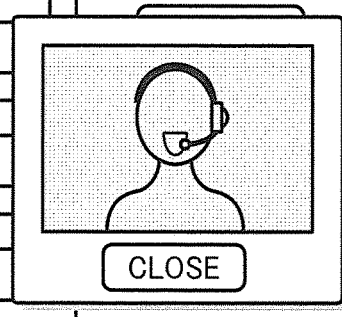

As illustrated in FIG. 9A, the user touches the "SUPPORT" button displayed on the content confirmation screen (S31). In response to this input from the user, the user support unit 105 establishes two-way communications with a remote support center (S32). Then, the user support unit 105 activates the digital camera 140 to start capturing video of the user with the user's voice (S33). The user support unit 105 sends the captured video with voice to the support center (S34). The support center sends video of an operator with voice to the image forming apparatus 100a (S35) to implement real-time two-way communications using video and audio (e.g., video chatting) between the support center and the image forming apparatus 100a.

The user support unit 105 may overlay a video chatting screen on the content confirmation screen as illustrated in FIG. 9A (S36). The user may communicate with the operator via the video chatting screen to receive the operator's advice on how to fill out the application form. By contrast, the operator may guess the user's sex or age from the user's appearance on the video to authenticate the applicant.

A description has been given of one exemplary embodiment of the present invention. Hereinafter, a description is given of another exemplary embodiment of the present invention. A description of elements, members, components, or operations that are same as those of the exemplary embodiment described above will be omitted below.

Figure 10:
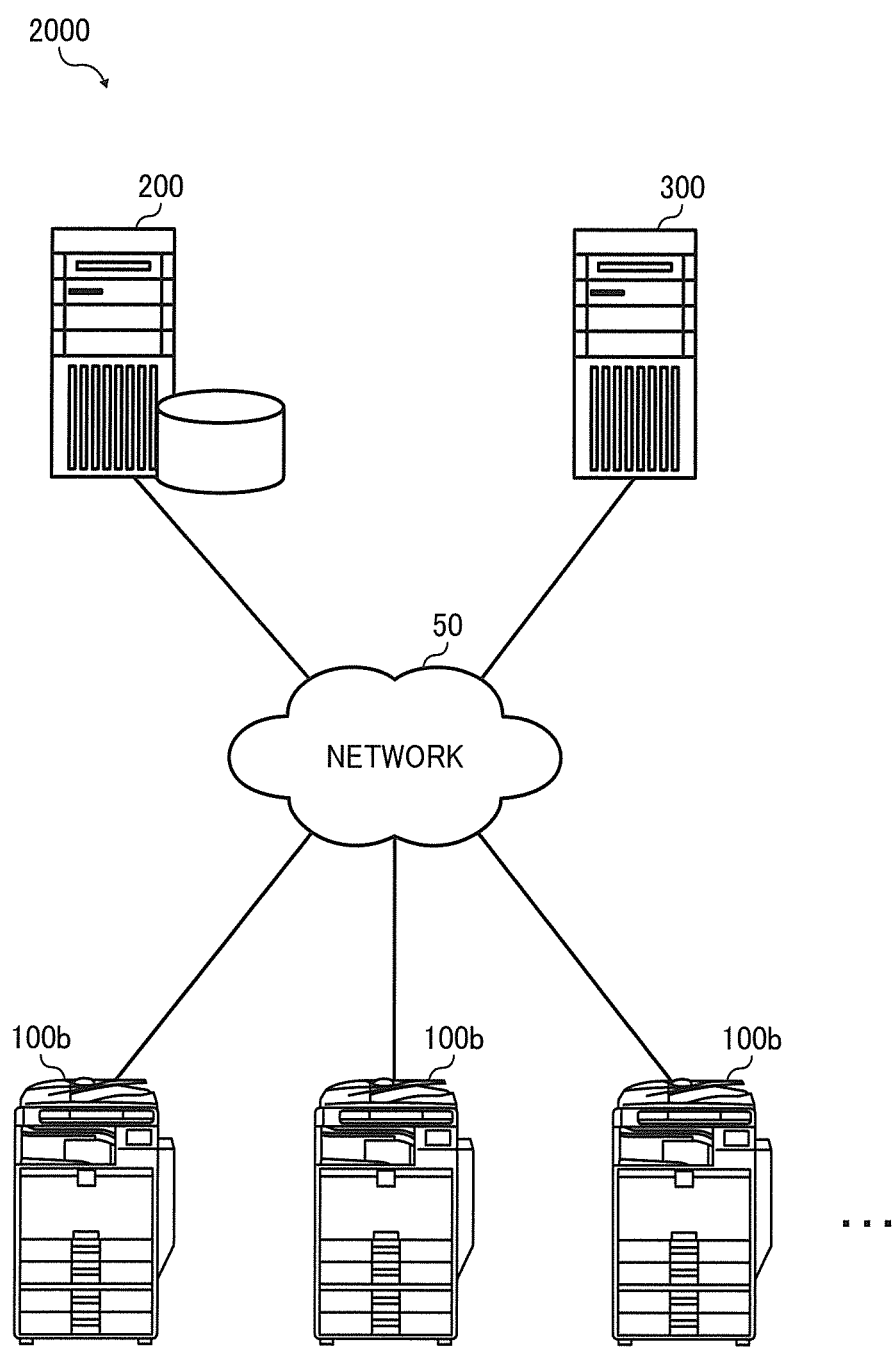
FIG. 10 is a view illustrating an application preparation supporting system according to a further exemplary embodiment of the present invention.

FIG. 10 is a view illustrating an application preparation support system 2000 according to a further exemplary embodiment of the present invention. The application preparation support system 1000 according to this embodiment includes at least one image forming apparatus 100b, a personal information management server 200, and the application reception server 300. The image forming apparatus 100b, the personal information management server 200, and the application reception server 300 are communicably coupled to one another via the network 50.

Like the image forming apparatus 100a, the image forming apparatus 100b includes the control panel 120 having the display 124 that supports a touch panel system, the IC card reader 130, and the digital camera 140. The personal information management server 200 is a network-capable information processing apparatus as a database that provides the personal information of the user to the image forming apparatus 100b in response to an inquiry from the image forming apparatus 100b. A description has been given of the application reception server 300 with reference to FIG. 1, and redundant description thereof is omitted.

Hereinafter, a description is given of functional configurations of the image forming apparatus 100b, the personal information management server 200, and the application reception server 300 of the application preparation support system 2000 with reference to a block diagram of FIG. 11.

The image forming apparatus 100b according to this exemplary embodiment includes the application form selection acceptance unit 102, the individual authentication information input acceptance unit 103, the personal information acquisition unit 104, the user support unit 105, the application form generator 106, the application form output unit 107, a personal information acquisition request unit 114, a personal information update acceptance unit 116, a personal information update request unit 118, and the template management unit 108.

The personal information acquisition request unit 114 acquires the personal information of the user from the personal information management server 200.

The personal information update acceptance unit 116 receives an update of the personal information that is registered in advance in the personal information management server 200.

The personal information update request unit 118 requests the personal information management server 200 to update the personal information registered therein.

In this embodiment, the individual authentication information input acceptance unit 103 receives an input of the individual authentication information to be used for logging in the personal information management server 200 or the individual authentication information relating to the IC card. The application form generator 106 generates an application form based on at least one of the personal information acquired from the IC card or the personal information acquired from the personal information management server 200.

The image forming apparatus 100b is substantially similar in functional configuration to the image forming apparatus 100a, for the application form selection acceptance unit 102, the personal information acquisition unit 104, the user support unit 105, the application form output unit 107, and the template management unit 108, and redundant description thereof is omitted. These units 102 to 118 are implemented by the dedicated application installed on the image forming apparatus 100b, which operate in cooperation with hardware as illustrated in FIG. 16A.

The personal information management server 200 includes a user authentication unit 202, a personal information provider 204, a personal information update unit 206, and a personal information management unit 208.

The user authentication unit 202 performs user authentication.

The personal information provider 204 provides the user's personal information to the image forming apparatus 100b.

The personal information update unit 206 updates a registered content of the user's personal information.

The personal information management unit 208 manages the user's personal information.

A description has been given above of the functional configurations of the image forming apparatus 100b and the personal information management server 200 of the application preparation support system 2000. Hereinafter, a description is given of operations performed by each unit of the image forming apparatus 100b and the personal information management server 200 with reference to a sequence diagram of FIGS. 12A and 12B. In the following description, FIG. 11 will also be referenced as necessary.

First, the user who is going to prepare the application form touches a virtual button of "PREPARE APPLICATION FORM" in the main menu (see FIG. 2) displayed on the display 124 of the image forming apparatus 100b to cause the image forming apparatus 100b to activate the dedicated application. That is, the image forming apparatus 100a receives the user selection of dedicated application, and activates the dedicated application (S51). According to the dedicated application, the image forming apparatus 100b displays a submenu screen on the display 124. FIG. 5B illustrates an example of the submenu screen. As illustrated in FIG. 5B, two virtual buttons of "PREPARE APPLICATION FORM" and "UPDATE PERSONAL INFORMATION" are displayed on the submenu screen. When the user touches the "PREPARE APPLICATION FORM" button, the application form selection acceptance unit 102 displays the application form selection screen (see FIG. 5A) on the display 124 (S52).

The user touches one of the virtual buttons displayed on the application form selection screen to select an application form that the user wants to prepare. That is, the image forming apparatus 100a receives the user selection of application form (S53). In response to the input from the user, the individual authentication information input acceptance unit 103 displays, on the display 124, a screen that allows a user to select a source from which the user's personal information is to be acquired (hereinafter referred to as a "personal information source selection screen") (S54). FIG. 5C illustrates an example of the personal information source selection screen displayed at S4. As illustrated in FIG. 5C, the personal information source selection screen includes a message "DO YOU WANT TO USE YOUR IC CARD TO INPUT PERSONAL INFORMATION?" and two virtual buttons of "YES" and "NO" to be selected by the user. Hereinafter, a description is given of two different operations; one executed where the user selects to use his/her IC card to input the personal information, and the other executed where the user does not select to use his/her IC card to input the personal information.

When the user touches the "NO" button on the personal information source selection screen, the individual authentication information input acceptance unit 103 displays the individual authentication information input screen as illustrated in FIG. 6B on the display 124 (S55).

The user inputs the individual authentication information (e.g., the user ID and the password) via the individual authentication information input screen (S56). In response to this input from the user, the personal information acquisition request unit 114 sends an authentication request including the individual authentication information that is input at S6 to the personal information management server 200 (S57). The user authentication unit 202 of the personal information management server 200 performs authentication of the user based upon the individual authentication information included in the authentication request sent from the personal information acquisition request unit 114 (S58). The user authentication unit 202 establishes a session between the personal information management server 200 and the image forming apparatus 100b provided that the authentication has succeeded.

Via the established session, the personal information acquisition request unit 114 sends a personal information transmission request to the personal information management server 200 (S59). In response to receiving the personal information transmission request, the personal information provider 204 of the personal information management server 200 retrieves the user's personal information from a personal information management table 500 managed by the personal information management unit 208 (S60).

FIG. 13 illustrates an example of the personal information management table 500. As illustrated in FIG. 13, the personal information management table 500 stores the user ID in association with the user's personal information. In this embodiment, the user logs in the personal information management server 200 from a client computer in advance to register his/her own personal information therein. The exemplary personal information management table of FIG. 13 stores a set of the personal information including the user's name, sex, address, date of birth, and data of face photograph in association with the user ID At S10, the personal information provider 204 searches the personal information management table 500 using the user ID according to the session of the personal information transmission request as a key to retrieve the personal information associated with the user ID. The personal information provider 204 sends the retrieved personal information to the image forming apparatus 100b (S61).

In response to receiving the personal information, the application form generator 106 of the image forming apparatus 100b reads out the template selected by the user at S2 from the template management unit 108 (S62). Subsequently, the application form generator 106 executes substantially the same processing as S15 to S19 above described with reference to FIG. 4B. The application form output unit 107 executes substantially the same processing as S21 to S27 above described with reference to FIG. 4B.

By contrast, when the user touches the "YES" button on the personal information source selection screen, the individual authentication information input acceptance unit 103 displays the individual authentication information input screen as illustrated in FIG. 6A on the display 124 (S63).

In a case where the user has the first type IC card, the user places the user's IC card over the IC card reader 130 (S64) and inputs the PIN (S65). In response to the "ENTER" button being touched after S15, the personal information acquisition unit 104 sends the PIN that is input at S15 to the IC card via the IC card reader 130. The IC chip contained in the IC card performs authentication processing based on the received PIN, and unlocks the personal information stored therein provided that the authentication has succeeded. In response to the personal information being unlocked, the personal information acquisition unit 104 reads out the personal information stored in the IC chip via the IC card reader 130 (S66). In a case where the user has the second type IC card, the personal information acquisition unit 104 may execute substantially the same processing as S8 to S13 above described with reference to FIG. 4A to acquire the personal information.

In response to the personal information being acquired from the user's IC card, the application form generator 106 reads out, from the 108, a template corresponding to the application form that the user has selected at S2 (S68). The application form generator 106 compares personal information to be filled in the template that is read out at S18 to the personal information acquired from the IC card to determine whether there is any necessary personal information that is lacking (S69).

When the determination indicates that at least one piece of information, e.g., the face photograph, is lacking, the individual authentication information input acceptance unit 103 displays, on the display 124, the individual authentication information input screen as illustrated in FIG. 6B (S70).

The user inputs the individual authentication information (e.g., the user ID and the password) via the individual authentication information input screen (S71). In response to this input from the user, the personal information acquisition request unit 114 sends the authentication request including the individual authentication information that is input at S21 to the personal information management server 200 (S72). The user authentication unit 202 of the personal information management server 200 performs authentication of the user based upon the individual authentication information included in the authentication request (S73). The user authentication unit 202 establishes a session between the personal information management server 200 and the image forming apparatus 100b provided that the authentication has succeeded.

The personal information acquisition request unit 114 sends the personal information transmission request to the personal information management server 200 via the established session (S74). In response to receiving the personal information transmission request, the personal information provider 204 of the personal information management server 200 retrieves the user's personal information from the personal information management table 500 (see FIG. 13) managed by the personal information management unit 208 (S75). The personal information provider 204 sends the retrieved personal information to the image forming apparatus 100b (S76).

The application form generator 106 fills in the personal information acquired from the IC card at S17 and the personal information acquired from the personal information management server 200 at S26 in the template that is read out at S18. In addition, in a case where the personal information thus acquired includes the face photograph, the application form generator 106 embeds the face photograph in the corresponding area of the template to synthesize the face photograph with the template. Further, the application form generator 106 may execute substantially the same processing as S15 to S19 described above with reference to FIG. 4B. Furthermore, the application form output unit 107 performs substantially the same processing as S21 to S27 described above with reference to FIG. 4B.

Figure 8B:
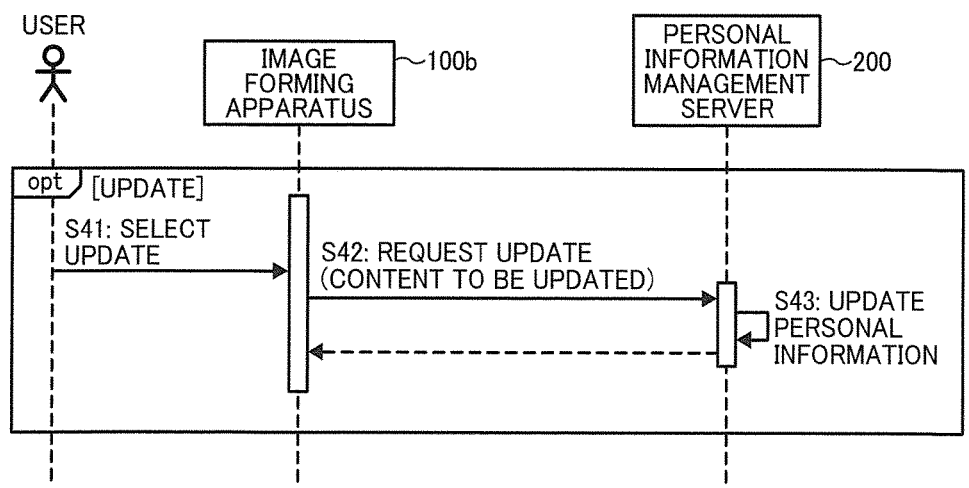
FIG. 8B is a sequence diagram illustrating an operation executed by an application preparation supporting system of FIG. 10.

Hereinafter, a description is given of updating the user's personal information registered in advance in the personal information management server 200 with reference to a sequence diagram of FIG. 8B.

Figure 14A:
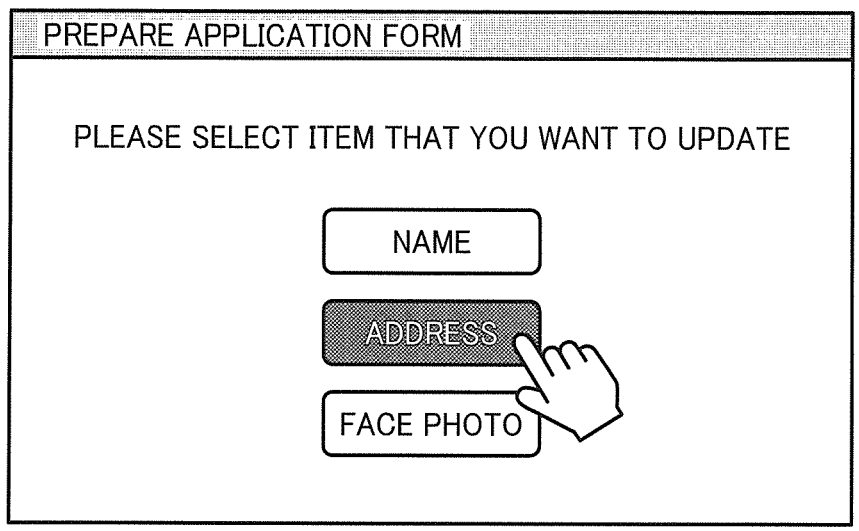
FIGS. 14A and 14B are views, each illustrating a service screen provided by an application form preparation application according to an exemplary embodiment of the present invention.

First, the user who wants to update the user's personal information touches the "UPDATE PERSONAL INFORMATION" button displayed on the submenu screen as illustrated in FIG. 5B. In response to this input from the user, the personal information update request unit 118 displays, on the display 124, a screen for allowing the user to select an item to be updated. FIG. 14A illustrates an example of the displayed screen for allowing the user to select an item to be updated. As illustrated in FIG. 14A, the screen for allowing the user to select an item to be updated may include three virtual buttons "NAME", "ADDRESS", and "FACE PHOTO", each being as an update target item, to be selected by the user.

Figure 14B:
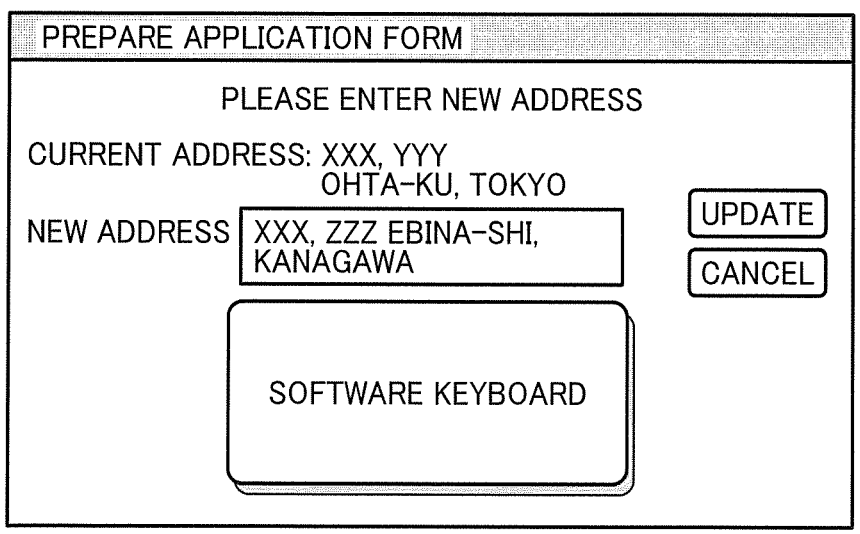

In a case where the user touches the "ADDRESS" button, the personal information update request unit 118 displays, on the display 124, an update screen that allows the user to update address data that is registered in advance in the personal information management table 500. FIG. 14B illustrates an example of the displayed update screen. As illustrated in FIG. 14B, the update screen may include an input form for entering a new address and a software keyboard.

The user inputs the new address in the input form using the software keyboard on the update screen and touches the "UPDATE" button (S41). In response to this input from the user, the personal information update request unit 118 generates a personal information update request including an update content (e.g., the new address that is input by the user, in this example). Then, the personal information update request unit 118 sends the generated personal information update request to the personal information management server 200 (S42).

In response to receiving the personal information update request, the personal information update unit 206 of the personal information management server 200 updates the personal information management table 500 (see FIG. 13) based upon the update content included in the personal information update request (S43). Specifically, the personal information update request unit 118 searches the personal information management table 500 using the user ID according to the session of the personal information update request as a key to overwrite data in an address field associated with the user with the update content (the new address) included in the personal information update request.

When the user touches the "NAME" button, for example, the personal information update request unit 118 displays, on the display 124, the update screen that allows the user to update name data that is registered in advance in the personal information management table 500. Further, the personal information update request unit 118 sends the update content that is input by the user (e.g., the new name, in this example) to the personal information management server 200. Also, when the user touches the "FACE PHOTO" button, for example, the personal information update request unit 118 displays the face photograph guidance screen (see FIG. 7A) on the display 124. In response to the user's operation of capturing the face photograph with the digital camera 140, the personal information update request unit 118 sends the personal information update request including the captured face photograph to the personal information management server 200. The personal information update unit 206 of the personal information management server 200 updates a value in a field corresponding to the update content included in the personal information update request in the personal information management table 500 (see FIG. 13) based upon the update content in substantially the same manner as described above with respect to the update of the user's address.

Further, in this exemplary embodiment, the personal information may be updated on the content confirmation screen of the application form.

Figure 15A:
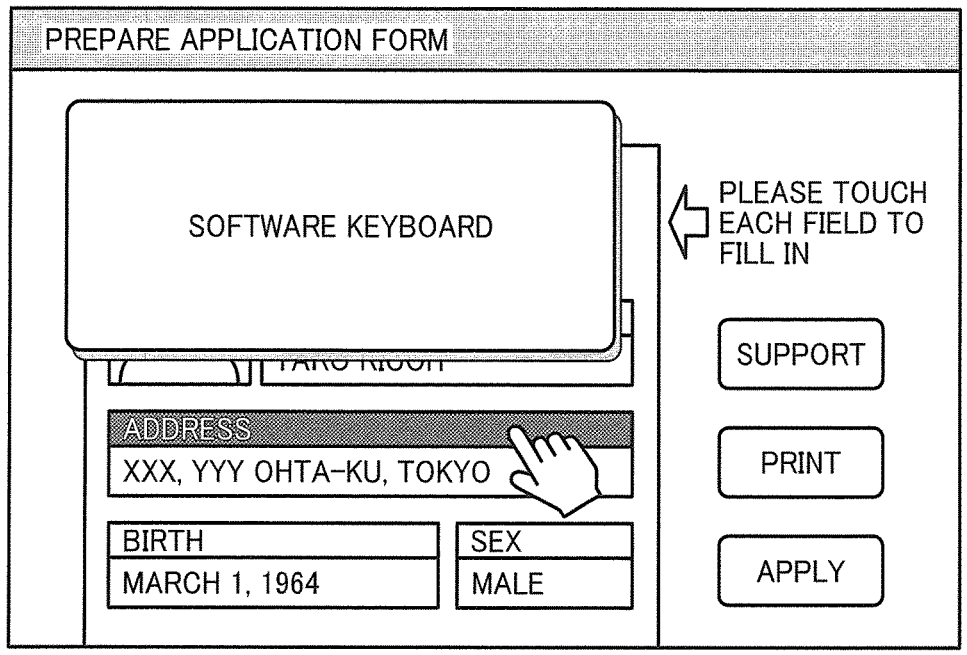
FIGS. 15A and 15B are views, each illustrating a service screen provided by an application form preparation application according to an exemplary embodiment of the present invention.
Figure 15B:
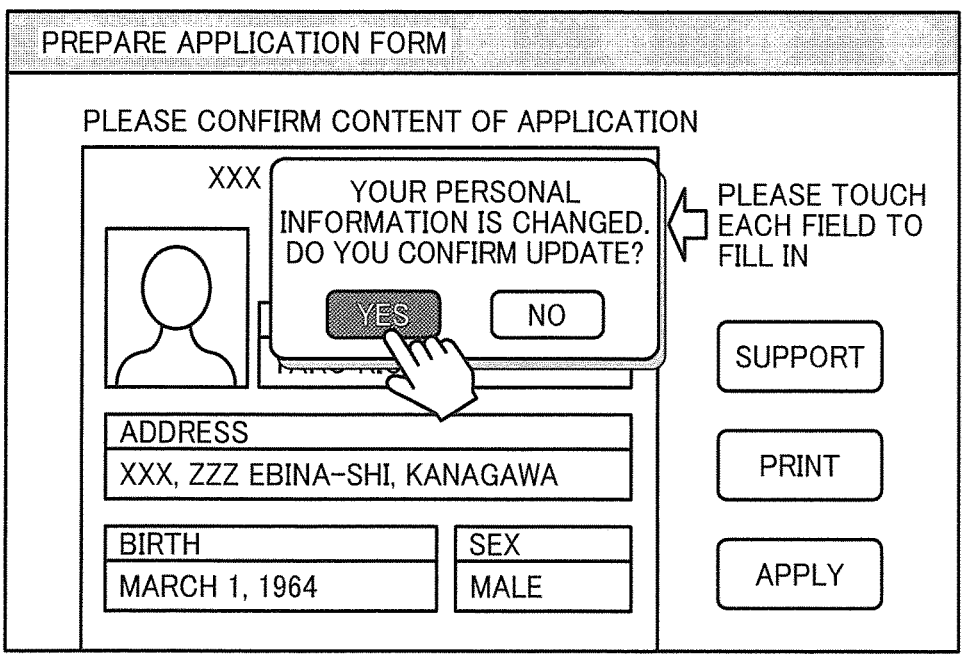

As illustrated in FIG. 15A, the user manually modifies the content of the personal information, which has been so far entered, via the preview screen on the content confirmation screen. After this modification, the user touches the "PRINT" or "APPLY" button to instruct the image forming apparatus 100b to output the application form. In response to this instruction from the user, the personal information update request unit 118 displays, on the content confirmation screen, a pop-up dialog that inquires of the user whether to update the personal information as illustrated in FIG. 15B. When the user touches the "YES" button in the pop-up dialog, the personal information update request unit 118 sends the personal information update request including the update content of the personal information that is input by the user via the preview screen to the personal information management server 200. In response to receiving the personal information update request, the personal information update unit 206 of the personal information management server 200 updates a value in a field corresponding to the update content included in the personal information update request in the personal information management table 500 (see FIG. 13).

As described above, according to these exemplary embodiments, the user's efforts of filling in the personal information are saved when preparing the application form. Accordingly, the preparation of the application form is greatly simplified. In recent years, various ID cards such as a loyalty card are provided for the purpose of a sales promotion or collection of big data, and therefore various efforts are made to increase the number of such cards issued. However, not a few people may hesitate to apply for such cards as they find it bothersome to fill in their personal information on the application form. In view of such situation, the image forming apparatus according to the above-described embodiments, if provided in commercial facilities such as a rental shop or a convenience store, may be attractive to users because of the simplicity of the application procedure. Accordingly, an increase of users who apply for such cards can be expected.

Hereinafter, a description is given of hardware configurations of the image forming apparatuses 100a and 100b, the personal information management server 200, the application reception server 300, and the authentication server 400 with reference to FIGS. 16A and 16B.

As illustrated in FIG. 16A, the image forming apparatuses 100a and 100b each includes a controller (computer). The controller includes a processor 10, a read only memory (ROM) 12, a random access memory (RAM) 13, an auxiliary memory 14, an external connection interface 15, an input/output interface 16, a network interface 18, and an engine I/F 19. The processor 10, which is a central processing unit (CPU), controls entire operation of the image forming apparatus 100a or 100b. The ROM 12 stores a boot program or a firmware program. The RAM 13 provides a work area for executing the program loaded from the ROM 12. The auxiliary memory 14 stores an operating system (OS) or applications. The external connection interface 15 is an interface for connecting the controller with an external input/output device such as the IC card reader 130 or the digital camera 140. The input/output interface 16 is an interface for connecting the controller with, for example, the control panel 120. In this example, the input/output interface 16 is a user interface that interacts with a user. The network interface 18 is an interface for connecting the controller with the network 50, such as a network interface circuit. The engine I/F 19 is an interface for connecting the controller with an image forming engine 150, which forms an image on recording sheet. The image forming engine corresponds to various hardware to print an image, such as a photoconductor, exposure device, charger, developer, cleaning device, fixing device, etc.

Figure 3:
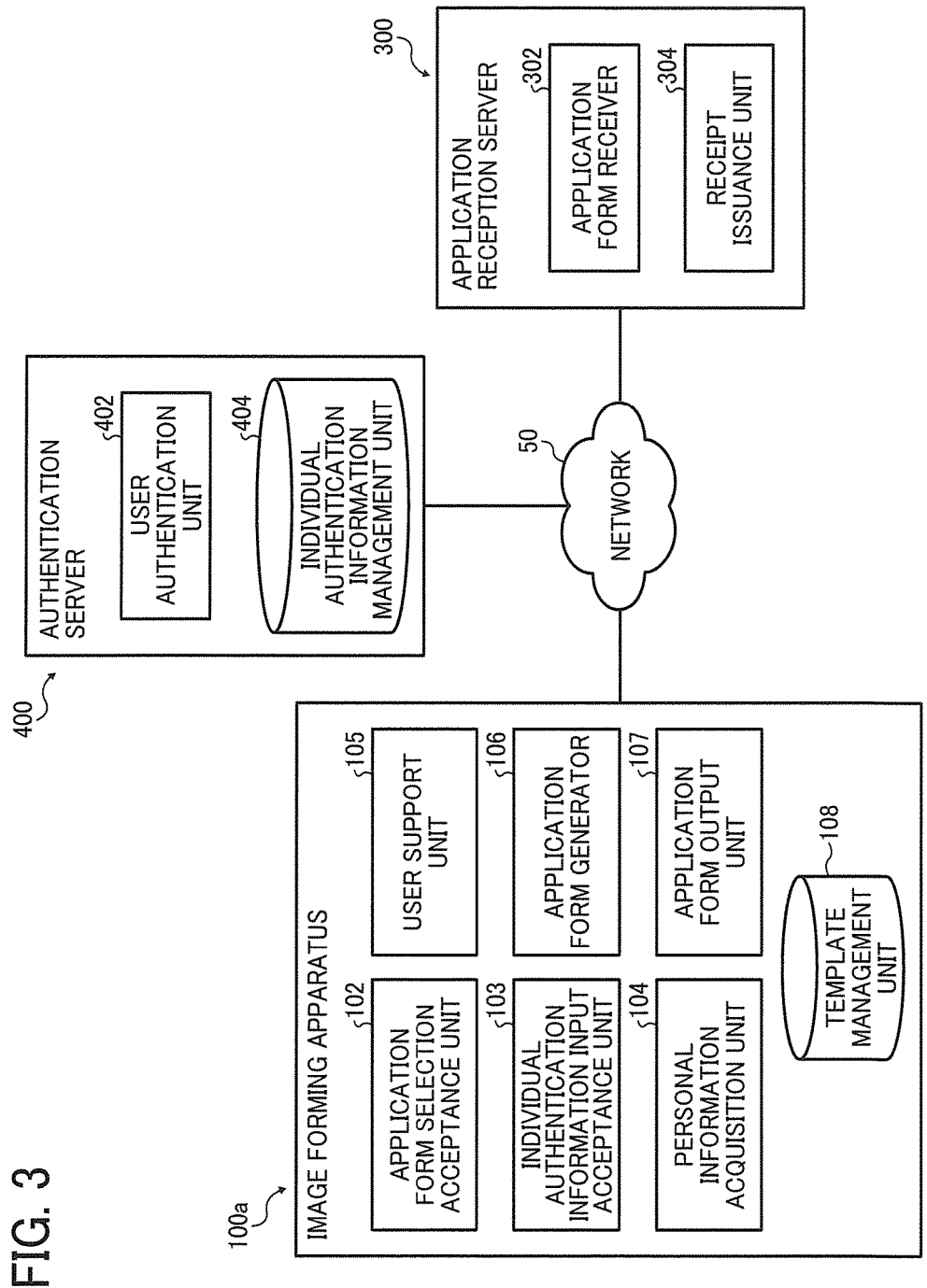
FIG. 3 is a block diagram illustrating a functional configuration of the image forming apparatus and servers constituting the network system of FIG. 1.
Figure 4B:
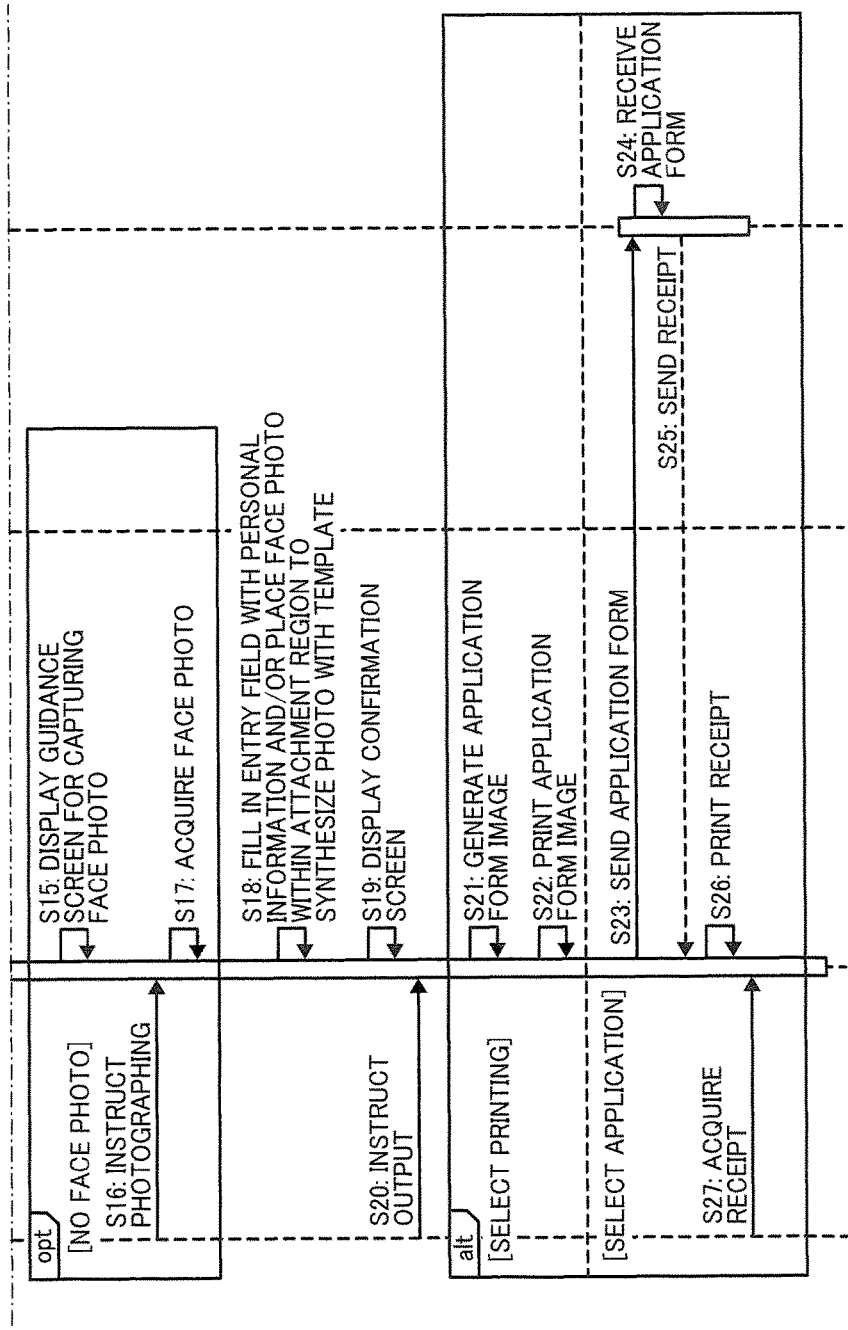
Figure 11:
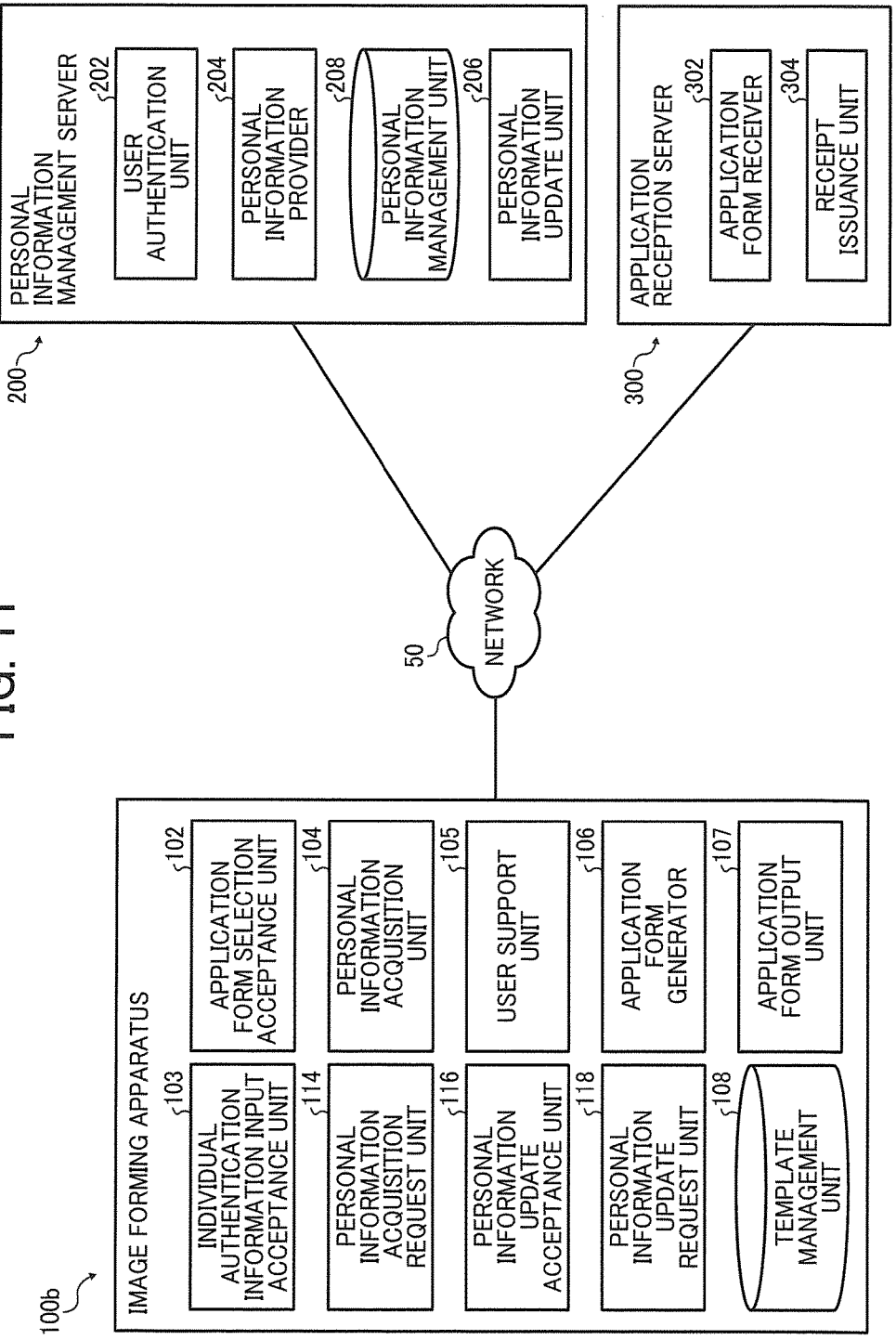
FIG. 11 is a block diagram illustrating a functional configuration of the image forming apparatus and servers constituting the application preparation supporting system of FIG. 10.
Figure 12A:
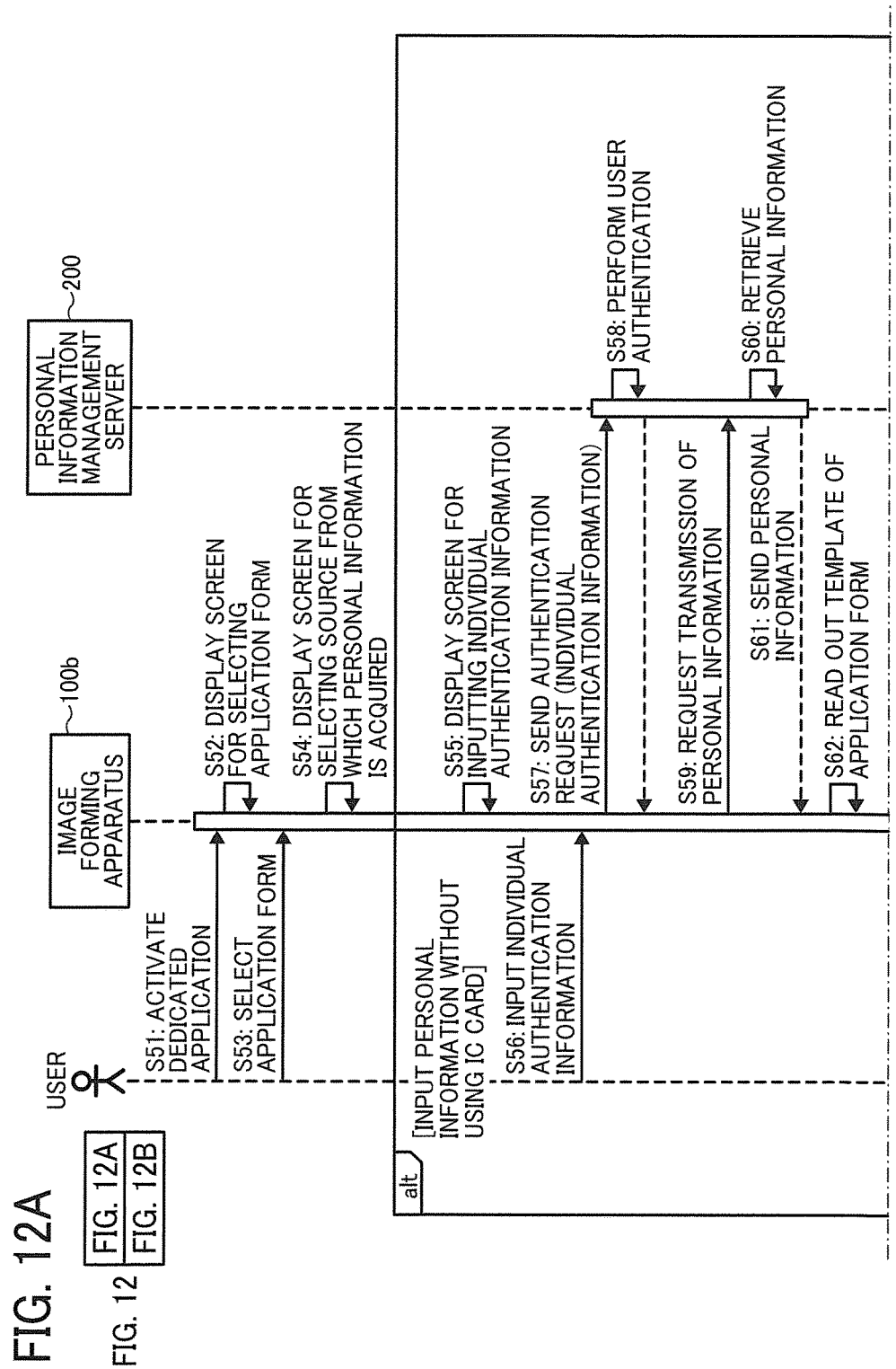
FIGS. 12A and 12B are sequence diagrams illustrating an operation executed by the application preparation supporting system of FIG. 10.
Figure 12B:
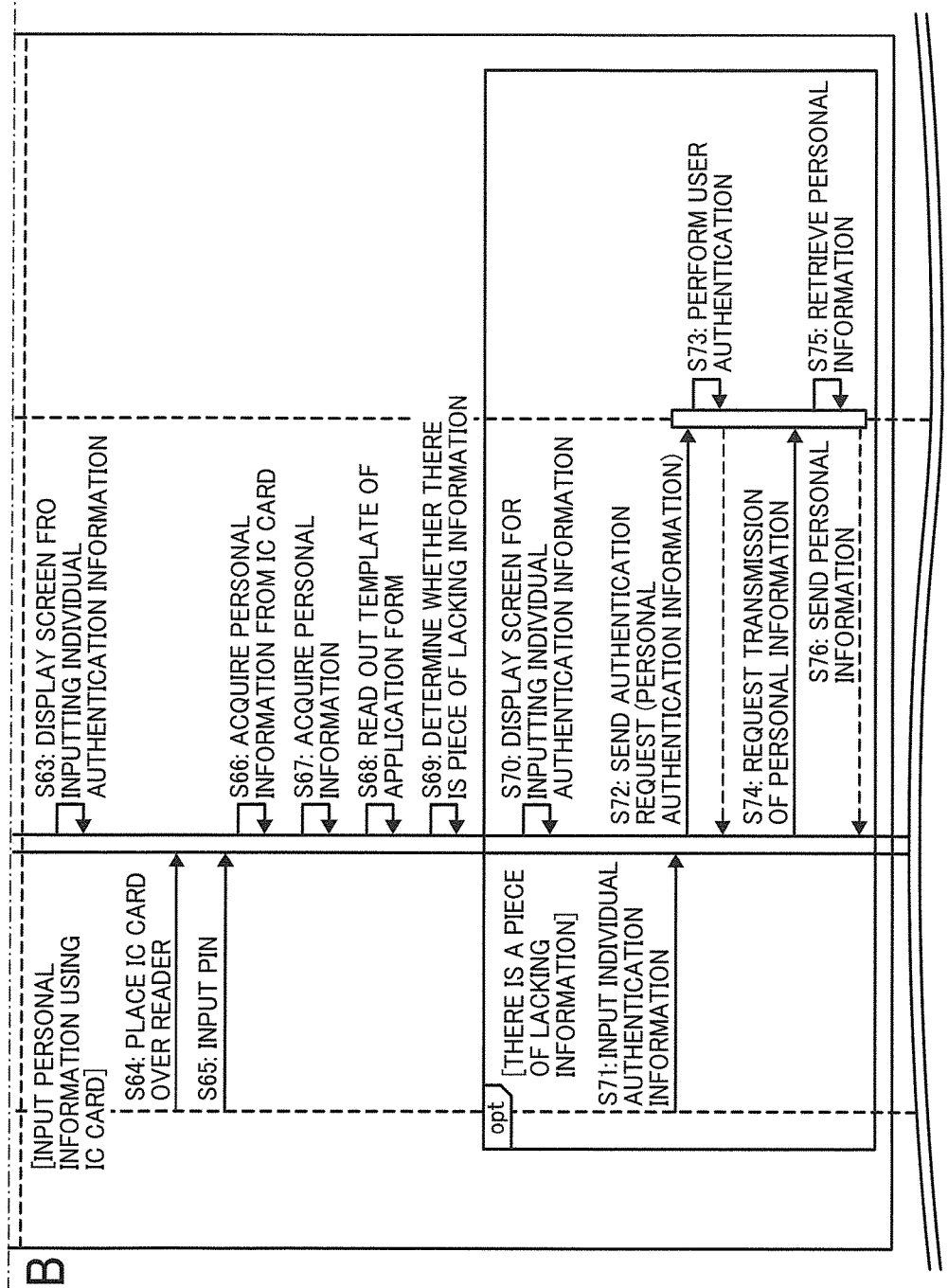

In the above-described embodiments, the processor 10 executes the dedicated program stored in the ROM 12 using the work area provided by the RAM 13 to implement process of each unit illustrated in FIGS. 3 and 11. In other words, the processor 10 of the image forming apparatus 100a executes the dedicated program using the RAM 13 as the work area to implement the application form selection acceptance unit 102, the individual authentication information input acceptance unit 103, the personal information acquisition unit 104, the user support unit 105, the application form generator 106, the application form output unit 107, and the template management unit 108. Also, the processor 10 of the image forming apparatus 100b executes the dedicated program using the RAM 13 as the work area to implement the application form selection acceptance unit 102, the personal information acquisition unit 104, the user support unit 105, the application form generator 106, the application form output unit 107, the individual authentication information input acceptance unit 103, the personal information acquisition request unit 114, the personal information update acceptance unit 116, the personal information update request unit 118, and the template management unit 108.

Figure 16B:
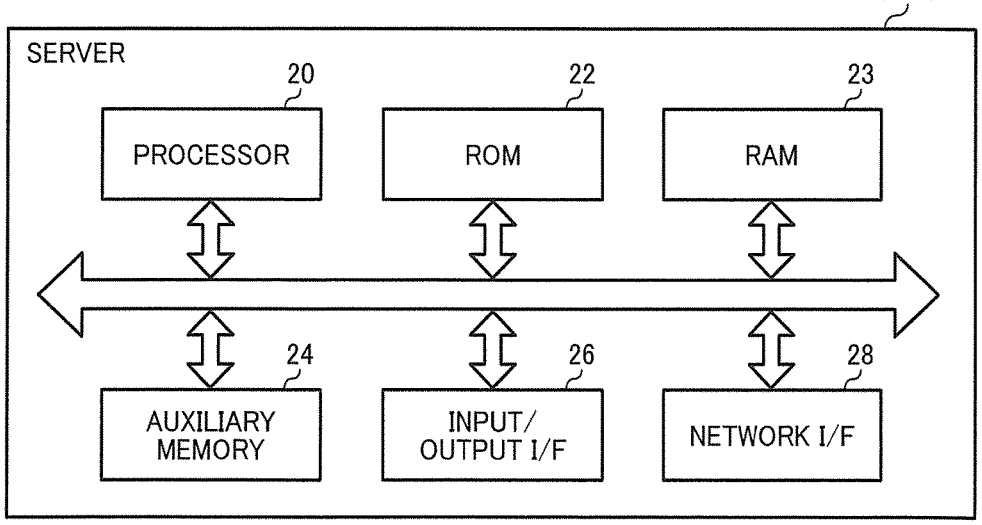
FIG. 16B is a block diagram illustrating a hardware configuration of servers of the network system of FIG. 1 and the application preparation supporting system of FIG. 10.

As illustrated in FIG. 16B, a computer constituting each of the personal information management server 200, the application reception server 300, and the authentication server 400 includes a processor 20, a ROM 22, a RAM 23, an auxiliary memory 24, an input/output interface 26, and a network interface 28. The processor 20 controls entire operation of the personal information management server 200, the application reception server 300, or the authentication server 400. The ROM 22 stores a boot program or a firmware program. The RAM 23 provides a work area for executing a program. The auxiliary memory 24 stores an operating system (OS) or applications. The input/output interface 26 is an interface for connecting the personal information management server 200, the application reception server 300, or the authentication server 400 with a control panel or a display. The network interface 28 is an interface for connecting the personal information management server 200, the application reception server 300, or the authentication server 400 with the network 50.

In the above-described embodiments, the processor 20 executes the dedicated program stored in the ROM 22 using the work area provided by the RAM 23 to implement process of each unit illustrated in FIGS. 3 and 11. In other words, the processor 20 of the personal information management server 200 executes the dedicated program using the RAM 23 as the work area to implement the user authentication unit 202, the personal information provider 204, the personal information update unit 206, and the personal information management unit 208. Further, the processor 20 of the application reception server 300 executes the dedicated program using the RAM 23 as the work area to implement the application form receiver 302 and the receipt issuance unit 304. Furthermore, the processor 20 of the authentication server 400 executes the dedicated program using the RAM 23 as the work area to implement the user authentication unit 402 and the individual authentication information management unit 404.

Each function in the above-described embodiments may be implemented by a program described in C, C++, C# or Java (registered trademark). The program may be provided using any storage medium that is readable by an apparatus, such as a hard disk drive, compact disc (CD) ROM, magneto-optical disc (MO), digital versatile disc (DVD), a flexible disc, erasable programmable read-only memory (EPROM), or electrically erasable PROM. Alternatively, the program may be transmitted via network such that other apparatus can receive it.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Further, the network can comprise any conventional terrestrial or wireless communications network, such as the Internet.

What is claimed is:

1. An image forming apparatus comprising:
an imaging device to capture an image;
a user interface to receive, from an applicant, an instruction for selecting a desired application form template amongst plural templates registered by the image forming apparatus, the selected application form template having an entry field in which personal information is to be entered, and to receive an input of individual authentication information of the applicant;
circuitry to unlock an IC card based upon the individual authentication information of the applicant to acquire personal information of the applicant from the IC card, and to generate an application form for output, based on the selected application form template and the personal information acquired from the IC card, the image forming apparatus automatically populating the entry field of the selected application form template with the personal information acquired from the IC card; and
an image forming device to output the generated application form, wherein
when the selected application form template has an applicant image attachment area, the circuitry causes the user interface to display a face photograph guidance screen including a virtual operation key, and in response to user activation of the virtual operation key to instruct the imaging device to capture an image of the applicant, the circuitry causes the captured image of the applicant to be embedded in the applicant image attachment area of the application form template, to synthesize the image of the applicant in the generated application form.

2. The image forming apparatus according to claim 1, further comprising:
a transmitter to transmit the application form to an application reception server via a network,
wherein the image forming device outputs a receipt transmitted from the application reception server.

3. The image forming apparatus according to claim 1, wherein the imaging device captures video of the applicant with audio, and
the circuitry is further configured to transmit the captured video and audio of the applicant to a remote server to perform two-way communications with the remote server.

4. The image forming apparatus according to claim 1, wherein the transmitter further transmits the input individual authentication information to an authentication server via the network to request for authentication of the applicant, and the circuitry unlocks the IC card based on an authentication result transmitted from the authentication server.

5. A system for supporting preparation of an application form, comprising:
at least one image forming apparatus including a user interface and an imaging device; and
a personal information management server connected to the image forming apparatus via a network, the personal information management server being configured to manage personal information of the applicant,
wherein the image forming apparatus further includes at least one processor configured to:
receive, via the user interface from the applicant, an instruction for selecting a desired application form template amongst plural templates registered by the image forming apparatus, the selected application form template having an entry field in which personal information is to be entered;
receive, via the user interface, an input of individual authentication information of the applicant;

log in the personal information management server based upon the input individual authentication information to acquire the personal information associated with the individual authentication information from the personal information management server;

cause the user interface to display, when the selected application form template has an applicant image attachment area, a face photograph guidance screen including a virtual operation key, and in response to user activation of the virtual operation key, cause the imaging device to capture an image of the applicant;

generate an application form based on the selected application form template and the personal information acquired from the personal information management server, the image forming apparatus automatically populating the entry field of the selected application form template with the personal information acquired from the personal information management server, and when the selected application form template has the applicant image attachment area and the image of the applicant has been captured via the imaging device in response to user activation of the virtual operation key, cause the captured image of the applicant to be embedded in the attachment area to synthesize the image of the applicant in the generated application form; and output the generated application form.

6. The system according to claim 5, wherein the processor of the image forming apparatus further receives an update of the personal information, and transmits a personal information update request including an update content of the personal information to the personal information management server, and the personal information management server includes at least one processor configured to update the personal information associated with the individual authentication information based upon the update content.

7. The system according to claim 5, wherein the processor of the image forming apparatus is further configured to unlock an IC card based upon the input individual authentication information to acquire the personal information stored in the IC card, and to generate the application form based upon the personal information acquired from the IC card and the personal information acquired from the personal information management server.

8. A method performed by an image forming apparatus including a user interface and an imaging device for supporting preparation of an application form, the method comprising:

receiving, via a user interface, from an applicant, an instruction for selecting a desired application form template amongst plural templates registered by the image forming apparatus, the selected application form template having an entry field in which personal information is to be entered;

receiving, via a user interface, an input of individual authentication information of the applicant;

logging in a personal information management server based upon the input individual authentication information to acquire the personal information associated with the individual authentication information from the personal information management server;

causing the user interface to display, when the selected application form template has an applicant image attachment area, a face photograph guidance screen including a virtual operation key, and in response to user activation of the virtual operation key, causing the imaging device to capture an image of the applicant;

generating, by an image forming apparatus, an application form based on the selected application form template and the personal information acquired from the personal information management server, the image forming apparatus automatically populating the entry field of the selected application form template with the personal information acquired from the personal information management server, and when the selected application form template has the applicant image attachment area and the image of the applicant has been captured via the imaging device in response to user activation of the virtual operation key, causing the captured image of the applicant to be embedded in the attachment area to synthesize the image of the applicant in the generated application form; and outputting the generated application form.

9. The image forming apparatus according to claim 1, wherein the image forming device that outputs the generated application form prints the generated application form and transmit the generated application form to an application reception server via a network.

10. The image forming apparatus according to claim 1, wherein the image forming device that outputs the generated application form, in response to an instruction received via the user interface from the applicant for a desired form of output, (i) prints the generated application form or (ii) transmits the generated application form to an application reception server via a network.

11. The image forming apparatus according to claim 1, wherein the image forming device that outputs the generated application form including the embedded image of the applicant in the predetermined area of the generated application form, in response to an instruction received via the user interface from the applicant for a desired form of output, (i) prints the generated application form, including the embedded image of the applicant in the predetermined area of the generated application form, or (ii) transmits the generated application form, including the embedded image of the applicant in the predetermined area of the generated application form, to an application reception server via a network.

12. The image forming apparatus according to claim 1, further comprising:

a processor that executes one or more programs to configure the processor to provide an application to generate the application form, and a copying function to obtain a copy of the generated application form.

13. The image forming apparatus according to claim 1, wherein the circuitry determines whether the personal information of the applicant acquired from the IC card includes a stored image of the applicant, and in response to the circuitry determining that the personal information of the applicant acquired from the IC card includes the stored image of the applicant, the circuitry embeds the stored image of the applicant in the attachment area, to synthesize the face photograph with the application form, and in response to the circuitry determining that the personal information of the applicant acquired from the IC card does not include the stored image of the applicant, the circuitry causes the user interface to display the face photograph guidance screen.

* * * * *